Figure 3:
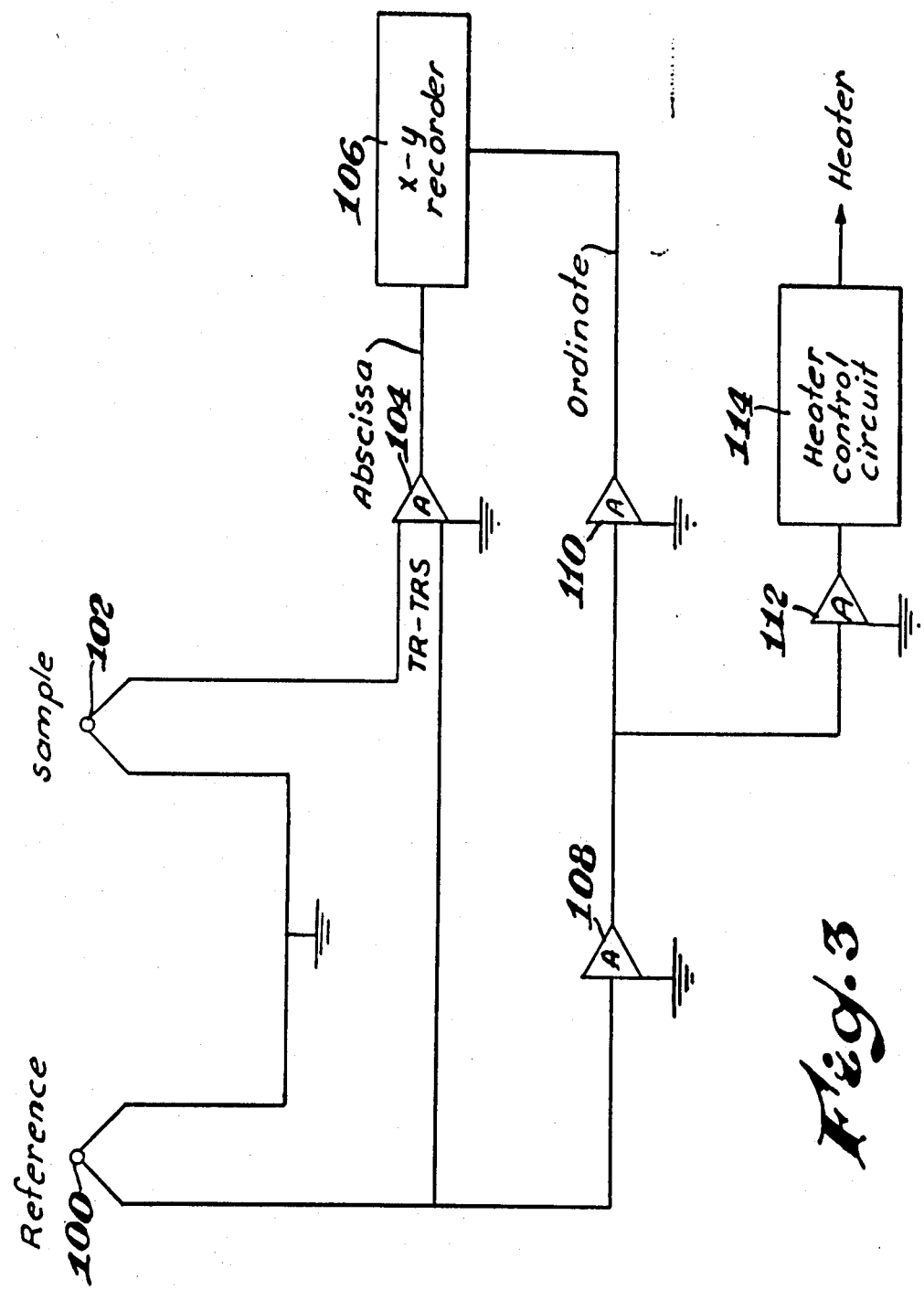

United States Patent [19]
Langer et al.

[11] 3,888,107
[45] June 10, 1975

[54] DIFFERENTIAL THERMAL ANALYSIS CELL ASSEMBLY

[75] Inventors: Horst G. Langer, Wayland, Mass.; Earl D. Ayers, Midland, Mich.

[73] Assignee: The Dow Chemical Company, Midland, Mich.

[22] Filed: Aug. 2, 1972

[21] Appl. No.: 277,236

Related U.S. Application Data

[63] Continuation of Ser. No. 871,517, Oct. 8, 1969, abandoned, which is a continuation-in-part of Ser. No. 856,396, Sept. 9, 1969, abandoned.

[52] U.S. Cl. .................................. 73/15 B; 250/425
[51] Int. Cl. ............................................ G01n 25/00
[58] Field of Search ............... 73/15 B; 250/288, 428

[56] References Cited
UNITED STATES PATENTS

| | | | |
|---|---|---|---|
| 2,882,411 | 4/1959 | Oppenheimer | 250/425 |
| 3,283,560 | 11/1968 | Harden et al. | 73/15 |

OTHER PUBLICATIONS

Murphy et al., "D.T.A. & Simultaneous Gas Analysis in Analytical Chemistry," Vol. 32, No. 10, Sept. 1960, pp. 1374–1375.

Langer et al., "Mass Spectrometric D.T.A. in Analytical Chemistry," Vol. 37, No. 3, March 1965, pp. 433–434.

Primary Examiner—Herbert Goldstein
Attorney, Agent, or Firm—William M. Yates; Earl D. Ayers

[57] ABSTRACT

This invention relates to a thermal analysis cell which is capable of supplying meaningful data in a high vacuum which is particularly useful for operations within a mass spectrometer or similar instrument which allows the heating of samples within the confinement of the mass spectrometer vacuum or within the ion source and has means for withdrawal from or addition to the cell of gases or vaporized materials. The cell comprises a silver block to facilitate achieving uniform heat throughout the cell. The silver block has a capped end having an aperture therein. The block is insulated against the push-through shaft by a section of boron nitride which is an excellent thermal insulator. The silver cell is equipped with well(s) containing control and reference temperature sensors. A third and larger well is designed to contain the sample. Inlet and outlet passages are provided through the block to facilitate gas or vapor movement in the capped area. The sample itself is loaded into a glass or metal capillary and pushed into the well and onto a needle which is coupled to a thermocouple temperature sensor assembly.

5 Claims, 3 Drawing Figures

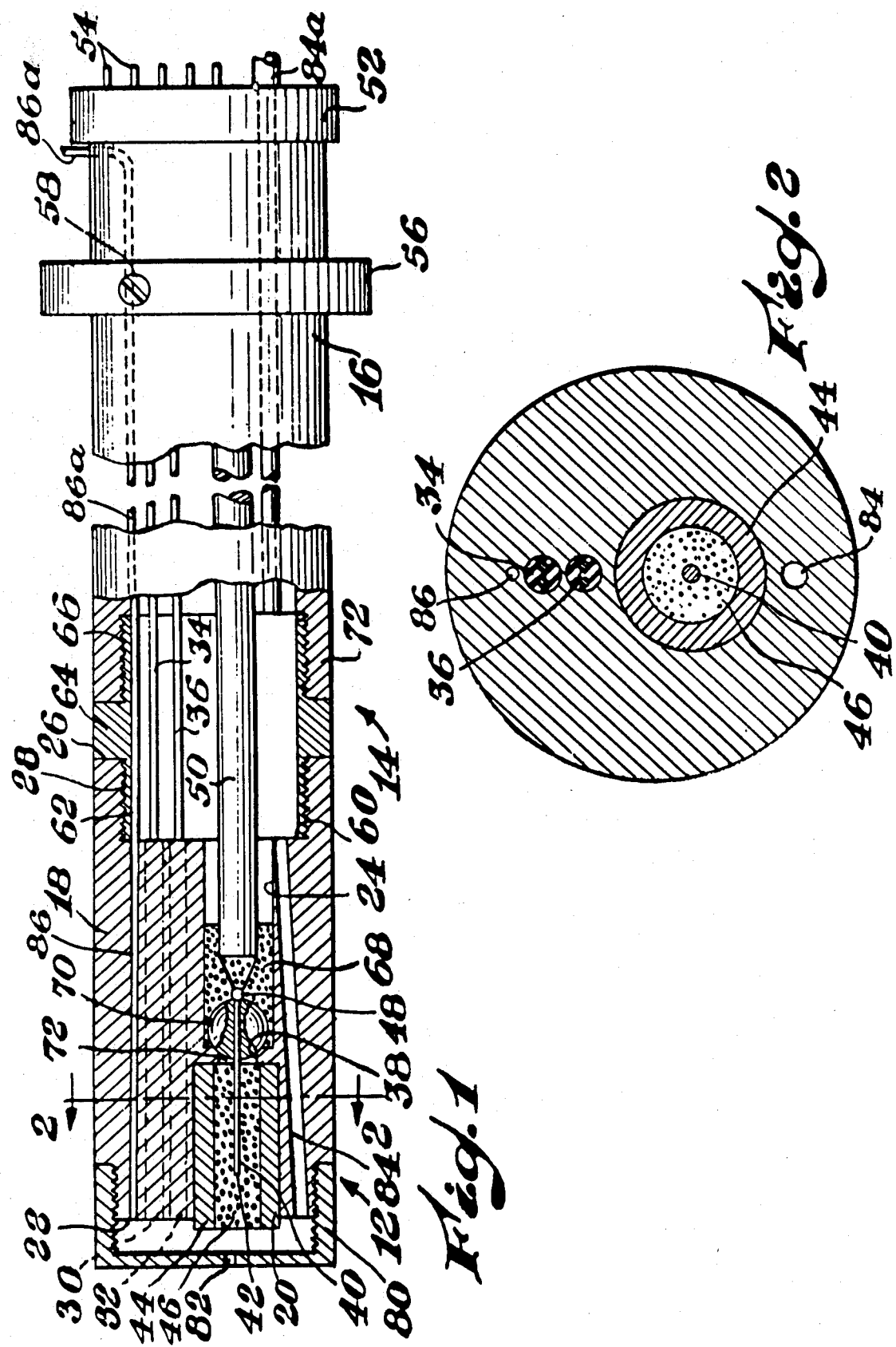

DIFFERENTIAL THERMAL ANALYSIS CELL ASSEMBLY

CROSS REFERENCE TO RELATED APPLICATIONS

This application is a continuation of Horst G. Langer and Earl D. Ayers' application entitled "Differential Thermal Analysis Cell Assembly", Ser. No. 871,517 filed Oct. 8, 1969, now abandoned, which is a continuation-in-part of application entitled "Differential Thermal Analysis Cell Assembly", Ser. No. 856,396 filed Sept. 9, 1969, now abandoned.

BACKGROUND OF THE INVENTION

This invention relates to differential thermal analysis cells and particularly to differential thermal analysis cells for use in a high vacuum such as exists inside a mass spectrometer, for example.

A thermal analysis cell which is capable of supplying meaningful data in a high vacuum is particularly useful for operations within a mass spectrometer or similar instrument.

However, even though mass spectrometers are sometimes equipped with devices which allow the heating of samples within the confinement of the mass spectrometer vacuum or within the ion source, and such devices sometimes also allow the measurement of sample temperatures during the heating process, these devices do not have the degree of versatility required for use with some types of samples which are to be subjected to differential thermal analysis within the mass spectrometer apparatus.

In differential thermal analysis, it is essential that the sample be heated at a predetermined rate of heating, usually a linear rate, that the sample temperature is known and indicated at all times, and for differential thermal analysis operations the sample temperature is continuously compared with that of an inert material in the same cell.

In general, this requires that the thermocouples located in the thermal analysis cell should be precisely at the same temperature at all times unless a chemical reaction occurs in the sample. Thus, it is also of extreme importance that equal heat transfer is guaranteed from the heat source to the thermal analysis cell, that no temperature gradient exists in the cell itself, that fast heat transfer is provided from the cell to the sample and that each thermocouple remains electrically insulated.

In addition, to make a cell useful it must be possible to load a sample into the cell and introduce the cell with the sample into a mass spectrometer without shutting down the operation of a mass spectrometer or other evacuated systems.

It is also desirable that the cell be able to be used with samples which liberate rather substantial amounts of gas as the cell block is heated, yet do not adversely affect the high vacuum condition maintained in the mass spectrometer.

In addition, it would be desirable to supply a reacting gas or vapor to the sample in the cell in some situations.

A principal object of this invention is to provide an improved differential thermal analysis cell assembly.

Another object of this invention is to provide an improved, more universally useful type of differential thermal analysis cell assembly which is adapted to be used in a high vacuum.

A further object of this invention is to provide an improved differential thermal analysis cell which has means for controlling the amount of gas which is introduced to the mass spectrometer.

A still further object of this invention is to provide a differential thermal analysis cell having internal means for mixing reactant materials.

In accordance with this invention, there is provided a cell assembly for insertion in a high vacuum device. The cell itself consists of a block of good thermally conductive metal, such as silver, for example, to guarantee uniform heat throughout the cell. It is insulated against the push-through shaft by which it is inserted in the mass spectrometer or other high vacuum device by a section of boron nitride or other suitable material which is an excellent thermal insulator. The silver cell is equipped with a well designed to contain the sample. The sample itself is loaded into a glass or metal capillary and pushed into the well and onto a needle which is coupled to a thermocouple assembly. A cup-shaped cap having a suitably sized aperture therein is coupled to the end of the block into which the sample is inserted. The block contains two spaced apart tubular passages for evacuating excess gas from the space between the block and the end cap and for introducing to that space a reacting vapor or gas or for introducing a carrier gas. The cell contains means coupled to the silver block for deriving reference and temperature control signals.

The only efficient way of heat transfer in a vacuum is by radiation, thus the DTA cell itself is surrounded during operation by a radiative furnace.

The invention, as well as additional objects and advantages thereof, will best be understood when the following detailed description is read in connection with the accompanying drawing, in which:

FIG. 1 is a side elevational view, partly broken away and in section, of a differential thermal analysis cell assembly in accordance with this invention; and FIG. 2 is a sectional view taken along the line 2—2 of FIG. 1, and FIG. 3 is a simplified block diagrammatical view of alternative reference and temperature control signal means.

Referring to the drawing, there is shown a differential thermal analysis cell assembly.

The cell assembly comprises a cell, indicated generally by the numeral 12, a thermally insulating coupler 14 and a probe rod part 16.

The cell 12 comprises an elongated cylindrical silver block 18 which contains an axial off-center bore 20 which extends inwardly from the end 22 of the block 18. A bore 24, axially aligned with the bore 20 extends towards the bore 20 from the other end 26 of the block 18. The bores 20, 24 are separated by the shoulder 38 which is formed by drilling a small bore between the bores 20, 24.

The end 26 has a counterbore 60 whose inner well surface 28 is threaded.

A pair of axial bores 30, 32, equal in size, extend through the block 18 from the end 22 to the end 60. Cables 34, 36 which contain thermocouples at their ends near the end 22 are disposed in the bores 30, 32 respectively.

A larger diameter cable 50 extends into the bore 24 and terminates in a thermocouple 48, usually a chromelalumel thermocouple embedded in ceramic 68. A silver needle-like element 40 is welded to the thermocouple 48 and extends through the space between the shoulder 38 and whose points 42 extends well into the bore 20 defining the sample receiving well.

The silver needle 40 is spaced from the silver block 18 by an electrically insulating ball 70, usually glass which extends from the shoulders 38 to the thermocouple 48.

The electrical and thermally insulating coupling element 14 is conveniently made of boron nitride and is a tubular element having a smooth inner wall, a center part 64 of the same outer diameter as the outer diameter of block 18, and threaded end parts 62, 66 of reduced diameter which (in the case of end part 62) engage the threaded part 28 of the block 18.

The probe tube 16 has a threaded end 72 which is threadedly coupled to the thread end part 66. The cables 34, 36, and 50 extend through the element 14 and probe tube 16 to the connector 52 which is coupled to the end of the probe tube 16 which is most remote from the silver block 18. The individual wires of the cables are connected to individual terminal pins 54 of the connector 52.

An annular shaped handle and stop member 56 fits over the probe tube 16 and is held in pre-determined position by the set screw 58.

A capillary type tube 44 having particulated sample material 46 disposed therein is inserted by friction fit into the bore 20. The tip 42 of the needle-like part 40 extends through the open part of the tube 44 and well into the sample material.

A cup shaped end cap 80 having an aperture 82 therein has inner side walls which threadedly engage a threaded inset side wall part near the end 22 of the block 18. The aperture 82 of end cap 80 is spaced from the end 22 of block 18.

Tubular passages 84, 86 extend longitudinally through the block 18 on opposite sides of the sample tube 44. The passage 86 is coupled to a tube 86a which extends through the hollow coupler 14 and the probe rod 16 to near the connector part 52.

A tube 84a extends from the connector part 52 through the probe rod and communicates with the interior of the coupling part 14. Since the seal between the sections 12, 14 and 16 is a hermetic seal, the tube 84a may be, for example, coupled to a vacuum pump and utilized to evacuate the space between the end cap 80 and the end 22 of block 18 as well as the interior of the probe assembly.

In operation, the tube 44, as mentioned above, is packed with sample material and inserted in the bore 20 with the tip 42 of the needle-like element 40 extending well into the sample and making physical contact with the sample 46. The element 40 is electrically insulated from the block 18 by cement 72 (usually a ceramic cement) and the ball 70.

The element 14, made of boron nitride, as previously mentioned, thermally isolates the cell tip part 12 from the probe tube 16 (usually made of metal).

The entire assembly 10 is adapted to be inserted into a high vacuum device such as a mass spectrometer, for example, through suitable sealable entry means (not shown). A cell probe entry and cell heating means which is especially useful in connection with this and other cell assemblies is disclosed and claimed in Horst G. Langer's U.S. Pat. No. 3,634,591 dated Jan. 11, 1972, entitled "Furnace Assembly For Thermal Analysis Use".

As the thermal reaction takes place, any excess gas emitted is withdrawn through the tubular passage 84, for example, with the gas which is needed for spectroscopic analysis entering the spectroscope through the aperture 82.

If the sample material is one which emits only a small amount of gas, the end cap may not be needed on the end of the block 18.

The thermal decomposition of some substances, such as calcium carbonate, for example, results in the release of considerable quantities of gas, however, and an end cap 80 having a small aperture 82 is used. In this way, most of the emitted gas is removed through the tubular passage 84.

In the thermal analysis of other materials it may be desirable to contact the sample material with a reacting gas or vapor (water vapor, for example) as the block 18 is heated. This may conveniently be done through the tube 86a, for example.

It should be realized that the tube 84a may extend across the coupling element 14 and be directly coupled to the passage 84 in any suitable manner. For the sake of simplicity of the drawings, the means of coupling the tubes 84a, 86a have not been shown, but suitable coupling means will suggest themselves to those skilled in the art.

The assembly 12 is about 8 inches in length in one embodiment which has been tested. The sample holder tube 44 is about 7 mm. in diameter, and may be made of glass or metal such as stainless steel or other metal which is non-reactive with the sample.

While the invention has been described as having three separate temperature sensors (usually thermocouples) for developing signals representing sample and reference temperatures and a furnace control signal, these signals may be derived from two temperature sensors.

Referring to FIG. 3, it may be seen that the output of the reference temperature sensor 100 and the sample temperature sensor 102 are coupled to the input of a very high input impedance operational amplifier 104 in a subtractive relationship. The output of the amplifier 104 drives the abscissa of an X-Y type recorder 106.

The reference signal is also coupled to a very high input impedance operational amplifier 108 whose output is coupled to the input of very high input impedance amplifier 110, 112 respectively.

The output of the amplifier 112 is coupled to a heater control circuit which is in turn coupled to the furnace (not shown) used to heat the cell assembly.

The output of amplifier 110 is coupled to the ordinate drive of the X-Y recorder 106.

The very high input impedance of 104, 108, prevents signal interaction which would hinder the use of the reference sensor signal also being used as the furnace control signal (or vice versa). It is assumed that the placement of the second (usually the reference) temperature sensor in the assembly is such that the output signal is suitable as the furnace control signal.

Thus, while it may be convenient to use three temperature sensors in many applications, the alternative shown in simplified form in FIG. 3 may be used.

It has been found that the device satisfies the desired conditions that three thermocouples located in the thermal analysis cell should be precisely at the same temperature at all times unless a chemical reaction occurs in the sample; that no temperature gradient exists in the cell itself, that fast heat transfer is provided from the cell to the sample and that each thermocouple remains electrically insulated, and that, with an end cap having an appropriate aperture 82, a wide variety of samples may be analyzed under vacuum pressure, and with or without carrier gases, reactant gases, or vapor being passed over the sample material.

What is claimed is:

1. A differential thermal analysis cell assembly adapted to be inserted into and removed from a high vacuum part of an analytical instrument, comprising an elongated cell section made of a block of highly thermally conductive metal having side walls and a forward end part, said forward end part having a sample receiving bore therein, temperature sensing means for measuring the temperature of any material in said sample receiving bore, means for sensing the temperature of at least one other part of said block, end capping means coupled to and spaced from said forward end part, said end capping means and said forward end part defining a substantially enclosed space surrounding said sample receiving bore, said end capping means having an aperture extending therethrough, said aperture providing a gas leakage path into said high vacuum part of said instrument, and tubular passage means extending through said block and communicating with said substantially enclosed space for withdrawing gases from said substantially enclosed space.

2. An assembly in accordance with claim 1, wherein tubular passage means are provided for introducing gas or vapor into said enclosed space.

3. An assembly in accordance with claim 1, wherein said cell has a thermal isolation section coupled to said cell section and a cell insertion section coupled to said thermal isolation section, said cell section, thermal isolation section and cell insertion section having generally the same outer diameter.

4. An assembly in accordance with claim 1, wherein said end capping means is removable.

5. An assembly in accordance with claim 1, wherein said end capping means has a single aperture.

* * * * *